United States Patent [19]
Gotoh et al.

[11] Patent Number: 5,126,180
[45] Date of Patent: Jun. 30, 1992

[54] OPTICAL RECORDING MEDIUM AND METHOD OF MANUFACTURING THE SAME

[75] Inventors: Akira Gotoh, Toride; Shuhei Nakamichi, Ibaraki; Shinkichi Horigome, Tachikawa; Tetsuya Nishida, Hachioji, all of Japan

[73] Assignees: Hitachi Maxell, Ltd., Osaka; Hitachi, Ltd., Tokyo, both of Japan

[21] Appl. No.: 579,899

[22] Filed: Sep. 10, 1990

[30] Foreign Application Priority Data

Sep. 12, 1989 [JP] Japan .................. 1-234598

[51] Int. Cl.⁵ .............................. B32B 3/02
[52] U.S. Cl. .......................... 428/64; 428/65; 428/411.1; 428/913; 369/288; 430/270; 430/945
[58] Field of Search .......... 428/64, 65, 411.1, 913; 369/288; 430/270, 945

[56] References Cited

U.S. PATENT DOCUMENTS

| 4,405,862 | 9/1983 | Bricot et al. | 250/318 |
| 4,638,335 | 1/1987 | Smith et al. | 430/945 |
| 4,686,143 | 8/1987 | Yoshikawa et al. | 428/411.1 |
| 4,798,781 | 1/1989 | Hiros et al. | 430/270 |
| 4,852,077 | 7/1989 | Clark et al. | 430/945 |

FOREIGN PATENT DOCUMENTS 0292683 4/1990 Japan .

Primary Examiner—Patrick J. Ryan
Assistant Examiner—Elizabeth Evans
Attorney, Agent, or Firm—Birch, Stewart, Kolasch & Birch

[57] ABSTRACT

Disclosed are optical recording media having interposed an organic compound between a metal stamper and a transparent substrate and forming a replica onto which a signal surface formed on the metal stamper is transferrable to the transparent substrate.

4 Claims, 10 Drawing Sheets

NITRO CELLULOSE THERMAL DECOMPOSITION
SAMPLE : FIBROUS NITROCELLULOSE POWER

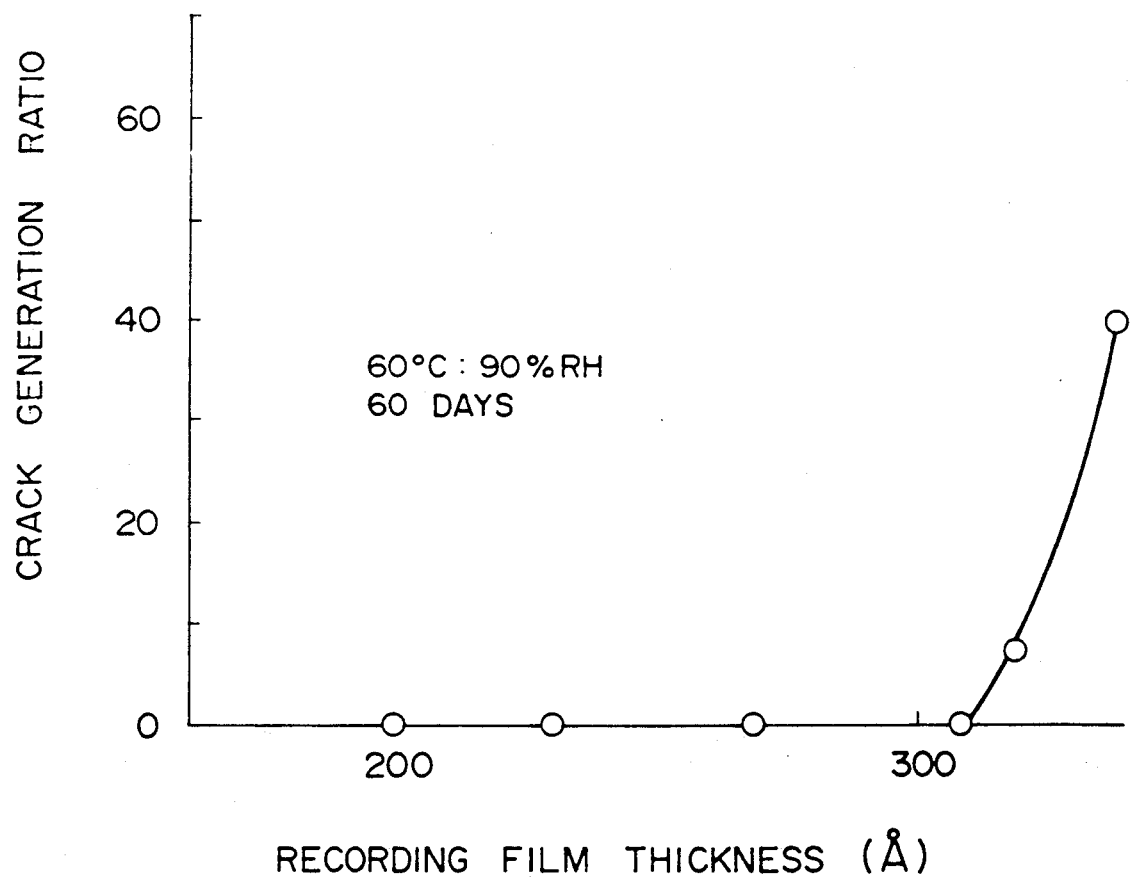

OPTICAL RECORDING MEDIUM AND METHOD OF MANUFACTURING THE SAME

BACKGROUND OF THE INVENTION

1. Field of the Invention

The present invention relates to an optical recording medium having a write once type recording layer and a method of manufacturing the same.

2. Discussion of Related Art

Conventionally known is an optical recording medium provided with an underlayer formed under a write once type recording layer, the underlayer being composed of a compound which causes thermal deformation such as explosion, dissolution, evaporation, decomposition, sublimation or the like at a temperature lower than the melting temperature of the recording layer.

In this specification, hereinafter, a compound which causes the above-described thermal deformation, when it is formed as an underlayer of a recording medium, is referred to as a thermally deforming compound.

The method of manufacturing such an underlayer includes a method of directly depositing the above thermally deforming compound on the recording signal pattern surface of a substrate by any means and an extension and exfoliation method. As the depositing method a spin coating method and the like are used.

When the spin depositing method is carried out, a solution of a thermally deforming compound dissolved in a suitable solvent is directly spin coated on the recording signal pattern surface of a transparent substrate.

Depositing a film by a method not limited to the spin coating method is disclosed, for example, in Japanese Patent Kokoku (Post Exam. Publication) No. Sho 62-27457 (U.S. Pat. No. 4,405,862). According to this method, holes are more effectively defined by combining a heat sensitive film (corresponding to the film of the thermally deforming compound) with a film (metal or semi-metal layer) having a smaller thickness and, absorbing energy property. In the disclosure, each of the heat sensitive film and the energy absorbing film of the combined films is on the side of the substrate.

The extension method is a new technology which was recently developed and disclosed in United States Patent Application filed on Jul. 20, 1990. The extension method is such that a solution of a first organic compound, i.e., a thermally deforming compound dissolved in a suitable solvent, is spin coated on the recording signal pattern surface of a recording medium making metal mold referred to as a stamper, and dried, semi-dried or remains undried to form an underlayer. Then a liquid second organic compound which is a curable resin material is placed on a portion of the underlayer, and a transparent substrate is pressed against the liquid resin material to expand it to a uniform thickness. Thereafter, the resin material is cured and the coated layer is exfoliated from the above stamper at the interface thereof so that the underlayer is integrally formed on the surface of the resin layer.

According to the extension method, when the recording medium is produced, the mixed member of the resin material and the above thermally deforming compound forming the underlayer makes contact with the recording signal pattern surface of the stamper. Therefore, it was discovered that a closely adhering force of the stamper with a replica was lowered as compared with the case in which a single layer of a thermally deforming compound makes contact with the signal surface of the stamper.

Consequently, the extension method and the formation of the mixed layer of the underlayer composed of the thermally deforming compound and the resin material are effective in that the replica is easily exfoliated from the stamper and deformation of a preformat pattern is prevented. Further, since an excessive exfoliating force is not necessary to be applied to the transparent substrate, the substrate and replica layer can be prevented from being broken, and thus this technology has an excellent meritorious effect.

The underlayer formed by the spin coating method from the above two underlayer forming methods is weak in respect to a closely adhering force with the transparent substrate and is liable to be easily exfoliated under the circumstances of high temperature and high humidity.

With respect to the underlayer formed by the depositing method of the above two underlayer forming methods, first, the underlayer formed by the spin coating method is liable to be exfoliated, in particular, under the circumstances of high temperature and high humidity, and the like, because a means for increasing the intimate adhesion strength with the transparent substrate is not present.

Further, a heat sensitive (thermally deforming) film is formed at the location next to a transparent substrate or an energy absorbing film (metal or semi-metal) in the case of an underlayer formed by the not specified depositing method disclosed, for example, in U.S. Pat. No. 4,405,862, but in this case a means for increasing the intimate adhesion strength between the underlayer and the transparent substrate or between the underlayer and energy absorbing film is not disclosed. Therefore, the heat sensitive (thermally deforming) film and the transparent substrate are also easily exfoliated from the underlayer under the circumstances of high temperature and high humidity.

On the other hand, in the case of the underlayer formed by the extension method, since the resin material forming the resin layer permeates into the compound forming the underlayer, the underlayer has a high bonding strength with the resin layer, and moreover the surface of the transparent substrate is subject to a silane treatment or the like so that the resin layer is strongly adhered to the transparent substrate, and thus finally the underlayer is strongly adhered to the transparent substrate.

Nevertheless, according to this method, a problem arises in that since the resin material forming the resin layer permeates into the underlayer and a part thereof is exposed on the surface of the underlayer (surface on which a recording layer is formed), the concentration of the compound in the underlayer is lowered, whereby curing of the underlayer is weakened which lowers recording sensitivity.

More specifically, although a metal or resin stamper has been conventionally known as the above stamper, the metal stamper (for example, a nickel stamper) has been used, because it is excellent in durability.

Nevertheless, there is a very strong intimate adhesion strength between the above metal stamper and a compound forming the above underlayer, and thus when an underlayer as a single layer composed of the above compound only is formed, a large exfoliating force must be applied to exfoliate a replica from the stamper. As a result, there is a drawback in that a transferred preformat pattern is deformed or a transparent substrate is damaged in the worse case.

Thus, when the replica is made, a resin material having a weak adhesion strength must be exposed on the surface in contact with the stamper in such a manner that a mixed member of the above resin material and compound is extended on the stamper, or a solution of the above compound is spin coated on the stamper and then a resin material having strong permeation into the compound is extended on the coated layer, which causes such problems as the lowering of sensitivity as described above, and the like.

SUMMARY OF THE INVENTION

Therefore, an object of the present invention is to provide a method of manufacturing an optical recording medium which is excellent in recording sensitivity and durability and capable of producing good replicas having a preformat pattern at a high yield.

A further object of the present invention is to provide the structure of the above optical recording medium.

To achieve the first object, according to the present invention, a method of manufacturing an optical recording medium, which includes the step of producing a replica in such a manner that an organic compound is extended between a metal stamper and a transparent substrate and a signal surface formed on the metal stamper is transferred onto the replica, is characterized by comprising the steps of:

forming a coating layer of the above first organic compound on the signal surface of the metal stamper;

placing a solution of a second organic compound which is permeable or dissolvable into the first organic compound at the center of the coating layer of the first organic compound in a doughnut shape and extending the solution by pressing a transparent substrate against the solution to form a laminated film which is comprised of a layer mainly composed of the first organic compound, including the second organic compound permeated into the surface of the first organic compound layer and a layer mainly composed of the second organic compound;

curing the second organic compound in the laminated film composed of the above two layers;

exfoliating a replica layer containing the cured second organic compound from the stamper;

optionally drying or baking the replica layer;

coating a solution composed only of the first organic compound on the surface of an obtained replica layer onto which a preformat pattern signal has been transferred to laminate a layer composed only of the first organic compound to a thickness of from 50 to 400 angstroms; and carrying out a baking treatment to laminate a recording layer on the layer composed only of the first organic compound and then further carrying out a baking treatment to complete the optical recording medium.

In this method, the first organic compound is a compound which causes thermal deformation such as explosion, dissolution, evaporation, decomposition, sublimation or the like at a temperature lower than the melting temperature of a material of the recording layer.

The second organic compound is a curing resin.

In other words, this is a method of manufacturing an optical recording medium which is carried out by sequentially laminating a layer composed of a second organic compound, a mixed layer composed of a first and the second organic compounds, an underlayer composed only of the first organic compound and a recording layer on one surface of the transparent substrate.

More specifically, the method summarized above comprises the steps of:

spin coating a solution of a first organic compound on the signal surface of the stamper on which a desired signal pattern is formed, and drying or semi-drying the coated layer or maintaining it in an undried state;

placing a solution of a second organic compound at the center of the coated layer in a ring shape and extending it to a uniform thickness with the transparent substrate, while forming a mixed layer by causing the second organic compound to permeate into and impregnate the first organic compound so that they are mixed with each other;

curing the second organic compound;

exfoliating the mixed layer subjected to the curing treatment from the stamper at the interface thereof; and spin coating a solution of the first organic compound on the thus transferred preformat pattern signal bearings surface of the mixed layer to form the underlayer at a desired thickness.

As an alternate embodiment for achieving the first object, a method of manufacturing an optical recording medium which is carried out by sequentially laminating a mixed layer of the first organic compound and the second organic compound, a layer composed only of the first organic compound, and a recording layer on one side of a transparent substrate comprises the steps of providing the transparent substrate having one side onto which a desired preformat pattern is pretransferred and formed, coating a mixed solution of the first and second organic compounds on the signal surface of the transparent substrate to a uniform thickness to form the mixed layer, curing the second organic compound in the mixed layer, drying the cured mixed layer, and spin coating a solution of the first organic compound on the mixed layer to form an underlayer having a desired thickness. Thereafter, a baking treatment is carried out to form the recording layer on the underlayer and a further baking treatment is carried out again to complete the manufacture of the recording medium.

To achieve the second object of the present invention, an optical recording medium, is provided with a flat shaped transparent substrate of a uniform thickness and a write once type recording layer, comprising a layer composed of a second organic compound, a mixed layer composed of first and second organic compounds, and an underlayer composed only of a first organic compound formed between the transparent substrate and the recording layer in the above sequence from the transparent substrate side to the recording layer side.

Further, as another embodiment of the second object, an optical recording medium, is provided with a transparent substrate having one surface on which a preformat pattern is formed and a write once type recording layer, which further comprises a mixed layer of first and second organic compounds and an underlayer composed only of the first organic compound which are formed between the transparent substrate and the recording layer in the above sequence from the transparent substrate side to the recording layer side.

BRIEF DESCRIPTION OF DRAWINGS

All of the drawings explain embodiments of the present invention, wherein:

FIG. 11 is a graph showing the relationship between a thickness of the recording film and an occurrence of cracks.

Figure 1:
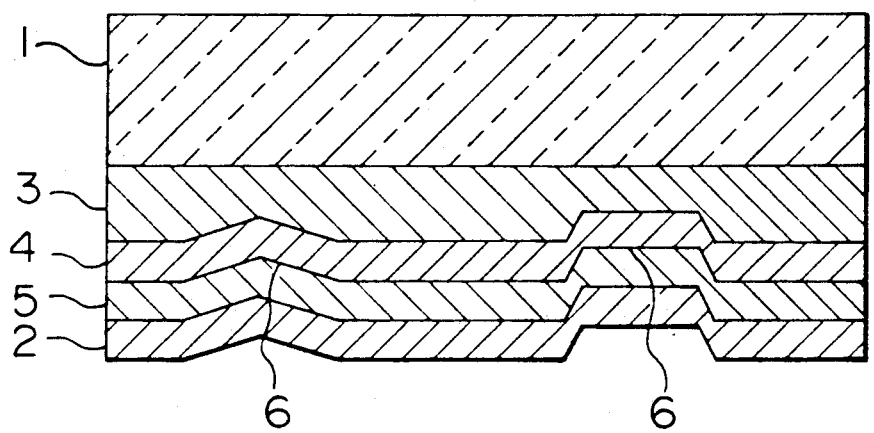
FIG. 1 is a cross sectional view schematically showing an optical recording medium according to the first embodiment.

The numbers in the drawings indicate the following.
1 ... transparent substrate, 2 ... recording layer, 3 ... resin layer, 4 ... mixed layer, 5 ... underlayer, 6 ... preformat pattern, 11 ... stamper, 12 ... signal surface, 13 ... mixed solution, 14 ... photocuring resin, 15 ... resin curing light.

DETAILED DISCUSSION OF THE INVENTION

When an underlayer, which is composed of a single compound causing thermal deformation such as explosive deformation (destroying a recording layer), dissolution, evaporation, decomposition, sublimation or the like at a temperature lower than the melting temperature of a recording layer, is formed under the recording layer, a gas pressure sufficient to accelerate the formation of holes in the recording layer is produced when a recording beam is irradiated thereon, and thus high recording sensitivity can be obtained.

With respect to the effect obtained according to the proper effect of the underlayer, in the present invention, since the layer composed of the solution of the above compound disposed just under the recording layer is formed after the resin material has been cured, the disadvantage of the prior art does not occur. More specifically, the desired effect of the underlayer is not weakened due to the permeation of the components into the underlayer such as by the resin material and the like, other than the compound forming the underlayer itself.

The detail of a difference between the effect of the above underlayer according to the present invention and that of other underlayers is considered as described below.

First, with respect to recording sensitivity, pits smaller in size and more accurate than conventional ones can be formed as well as pits having more excellent recording/reproducing sensitivity can be formed in the type of a recording medium in which information pits are recorded, for example, by irradiating a laser beam to a recording film. To describe this more concretely, the excellent recording sensitivity means that even if a spot diameter of the laser beam is made smaller under the same conditions of a laser power for inputting information, pits smaller in size and more accurate in shape can be recorded.

Figure 9:
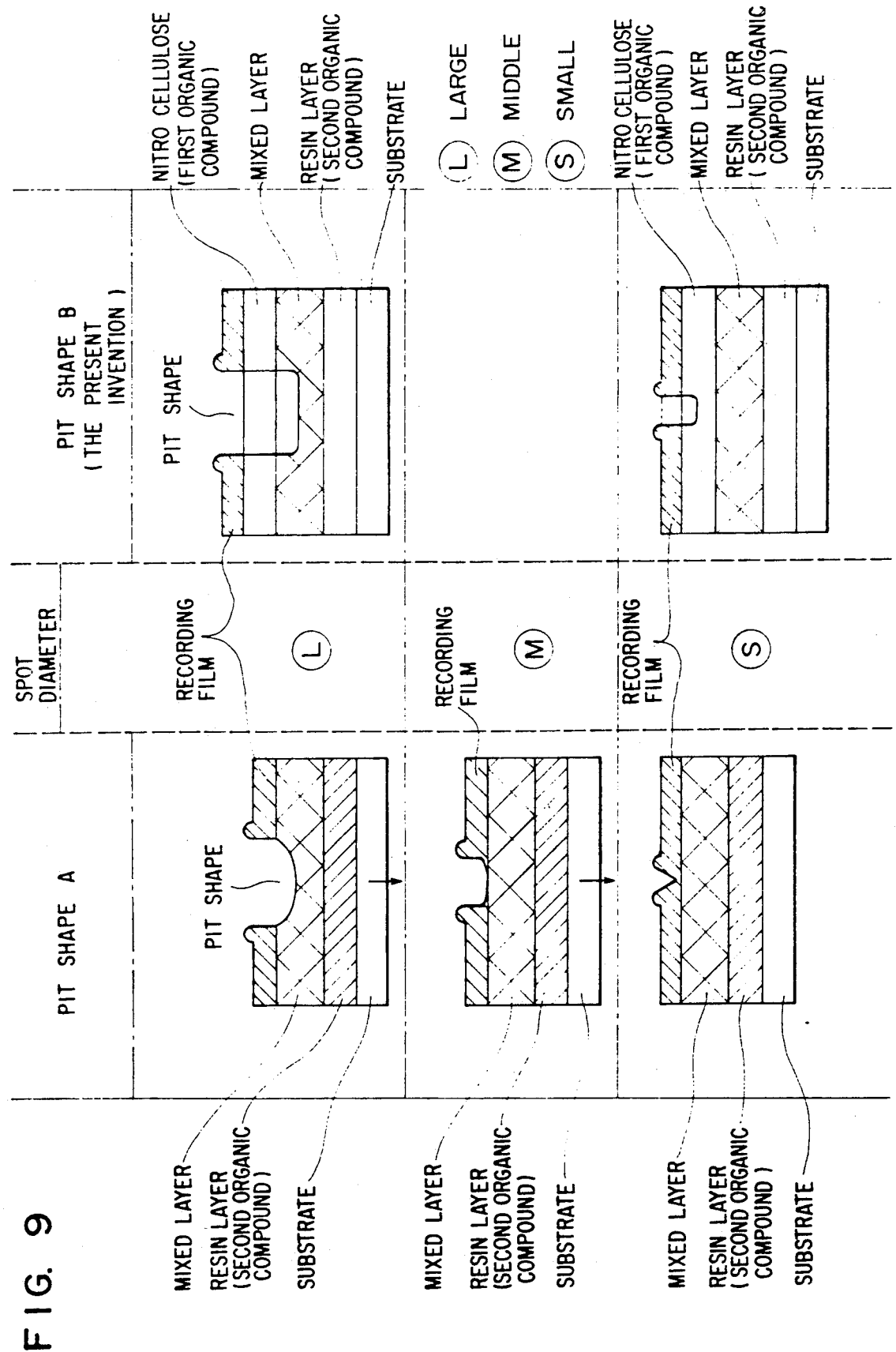
FIG. 9 is a schematic diagram comparing the present invention with prior art with the respect to the relationship of a spot diameter of a recording laser beam and a pit shape.

FIG. 9 shows the relationship between a diameter of a recording laser beam represented by a spot diameter and a shape of a pit to be recorded, wherein "a pit shape A" on the left side shows the pit shape in a recording medium recently developed by the inventors and "a pit shape B" on the right side shows the pit shape in a recording medium according to the present invention. The respective shapes correspond to the diameter of the spots shown at the center of the figure.

In the case of the pit shape A in the figure, as the spot diameter is made smaller, the pit is more inadequately formed. More specifically, a perfect pit hole is not defined in the recording film, and thus the pit shape is not clearly formed after all.

As described in the second paragraph on page 2 of the specification, this is supposed to be caused by that a mixing ratio of the thermally deforming compound effective in the formation of the pits is lowered in the component forming the mixed layer which is composed of the organic compound and formed under the film recording layer in the case of the recording medium according to the invention recently developed by the inventors.

On the other hand, in the case of the pit shape B in FIG. 9, it is found even if a laser beam having a small spot diameter is used, a pit having the shape which sufficiently accurately corresponds to the small diameter is formed.

It can be said that this advantage is achieved by the layer in which 100 percent of the thermally deforming compound (the first organic compound in the present invention) effective the formation of the pit exists is disposed under the recording film and the function of the compound is fully realized in the recording medium according to the present invention.

Next, in the present invention, the layer formed between the transparent substrate and the underlayer is the mixed layer composed of the resin material and the compound forming the underlayer, or the laminated layer of the resin layer and the mixed layer composed of the resin material and the compound forming the underlayer. Thus, the interlayer is adhered to the transparent substrate at the resin layer thereof having a large intimate adhesion strength with the transparent substrate and/or the mixed layer thereof containing the resin. The underlayer is closely adhered to the mixed layer composed of the said material and the compound thereof forming the underlayer. Accordingly, the intimate adhesion strength between the underlayer and the transparent substrate is increased. As a result, an effect of greatly improving an exfoliation resistance among the transparent substrate, resin layer, mixed layer and underlayer under the circumstances of high temperature and high humidity can be obtained.

On the other hand, when the optical recording medium is manufactured, the proper effect in action of the simple extension method can be reliably realized. More specifically, as described on page 3 of the specification, since the mixed layer which is composed of the resin material and the compound forming the underlayer, makes direct contact with the signal surface of the stamper, the exfoliating property of the replica from the stamper can be greatly increased as compared with the case wherein a compound which is composed of a single component and forms an underlayer makes contact with the signal surface of the stamper, whereby the preformat pattern of the exfoliated replica can be prevented from being deformed. Further, since an excessive exfoliating force is not applied to the transparent substrate, the breakage of a replica layer, the exfoliation of the replica layer from the substrate, or the cracking of the substrate can be avoided.

In conclusion, according to the optical recording medium having the arrangement of the present invention, the excellent intimate adhesion of the underlayer to the transparent substrate enables the improvement of the exfoliation resistance among the respective layers in the laminated layer at high temperature and high humidity, the easy exfoliation of the replica from the stamper in manufacturing, and the prevention of damage to the preformat pattern and the substrate in exfoliation simultaneously realized, while maintaining the effect of the underlayer obtained by the write once type recording layer (highly sensitive write once type recording characteristics).

FIG. 1 is a cross sectional view schematically showing an optical recording medium according to the first embodiment of the present invention, wherein a resin layer 3, a mixed layer 4 and an underlayer 5 are sequentially formed between a transparent substrate 1 and recording layer 2 from the transparent substrate 1 side outward to the recording layer 2. The resin layer 3 is composed of a resin material as the second organic compound. The mixed layer 4 is composed of the second organic compound and a first organic compound, i.e., the first organic compound which causes thermal deformation, such as explosion, dissolution, evaporation, decomposition, sublimation or the like, at a temperature lower than the melting temperatures of the material of the recording layer 2, and the underlayer 5 is composed only of the above first organic compound.

Note that in the figure preformat pattern 6 is formed at the contact interface with the underlayer 5 and the above mixed layer 4.

The transparent substrate 1 is composed of thermosetting resin, for example, glass, epoxy resin or the like and is formed to a flat plate having smooth front and back surfaces. The outside configuration thereof can be formed to any arbitrary shape such as a disk shape, card shape and the like, and the size thereof can be also arbitrarily designed.

The recording layer 2 is composed, for example, of a low melting point alloy mainly composed of tellurium and selenium or an organic dye material such as methine dye, cyanine dye or the like. The low melting point alloy type recording layer is formed by a vacuum film forming method such as sputtering or vacuum vaporization, and the organic dye type recording layer is formed by a spin coating method.

Used as the second organic compound forming the resin layer 3 is any arbitrary material which has substantially the same index of refraction as that of the above transparent substrate 1, excellent in optical characteristics and intimate adhesion with the transparent substrate 1, and has a large permeating and dissolving property into the first organic compound serving as the compound used as the underlayer. A photocuring resin material satisfying the above properties is preferably used, because one can very easily produce the resin layer with it.

The first organic compound forming the underlayer 5 is a compound which causes thermal deformation such as dissolution, evaporation, sublimation, decomposition, explosion or the like at a temperature lower than the melting point of the above recording layer 2.

Figure 8:
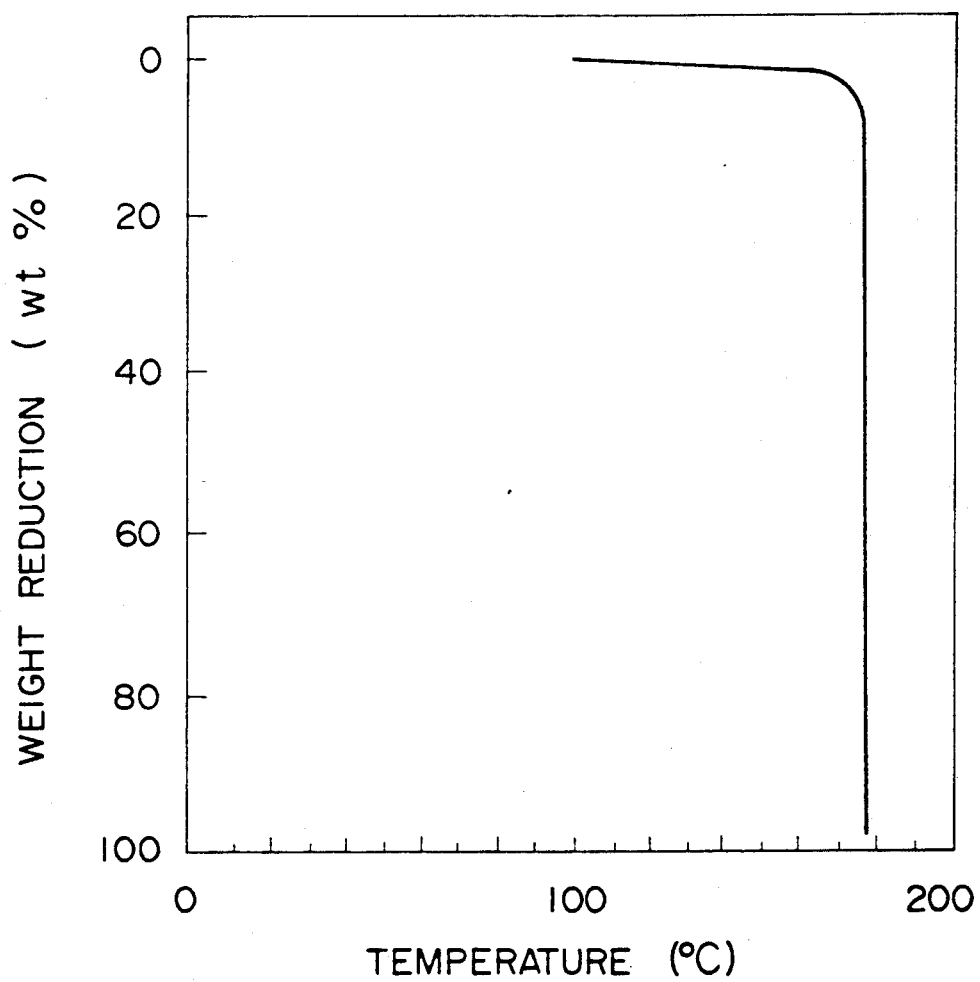
FIG. 8 is a graph showing thermal decomposition characteristics of nitrocellulose used in an underlayer.

A temperature at which the thermal deformation is caused is preferably in a range from 150° C. to 450° C., when the compound is used to the underlayer applied to the method of manufacturing the optical recording medium according to the present invention. For example, as shown in FIG. 8, in the case of a nitrocellulose compound (HI-1000, by ASAHI CHEMICAL INDUSTRY CO., LTD.), a kind of material which causes the thermal deformation at a temperature between 170° C. and 180° C. is most suitable in practical use.

As these compounds, materials, for example, polyvinyl alcohol, polyvinyl alcohol nitrate, a mixture of polyvinyl alcohol and barium azide, polymethyl penten sulfone, polytetrafluoroethylene, guanine, a plasma copolymer of the above hydrocarbons, and the like or a material mainly composed of at least one material selected from the group of these materials can be used in addition to the above kind of nitrocellulose.

The mixed layer 4 is composed of a mixture of the second organic compound forming the above resin layer 3 and the first organic compound forming the above underlayer 5. A content of the above compound (the first organic compound forming the underlayer) contained in the mixed layer 4 can be arbitrarily adjusted in consideration of the exfoliation property of the replica, but when it is set in a range from about 40 wt % to 95 wt %, an excellent result can be obtained.

The preformat pattern 6 comprises, for example, a prepit column such as address pits and a pregroove for guiding a recording/reproducing light spot. In the case of the disk shaped transparent substrate, the preformat pattern 6 is formed to a spiral shape or concentric circle shape about the center of the rotation of the transparent substrate, and in the case of the card shaped transparent substrate, it can be formed to parallel lines.

A method of manufacturing the optical recording medium according to the instant embodiment will be described below. The manufacturing thereof will be carried out in the following sequence.

Process 1

(i) A metal stamper 11 (hereinafter, referred to as a stamper) is prepared;

(ii) While the stamper 11 is rotated, a solution composed of the above compound dissolved in a suitable solvent which is a material of an underlayer 13 is dropped on the stamper 11;

(iii) The coated underlayer 13 is extended to a layer shape by accelerating the rotation of the stamper 11; and (iv) The extended underlayer 13 is dried or semi-dried.

Figure 2A:
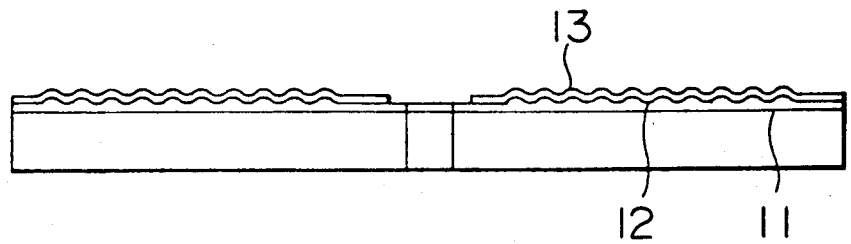
FIG. 2A to FIG. 2F are diagrams showing the manufacturing processes of the optical recording medium according to the first embodiment.
Figure 2B:
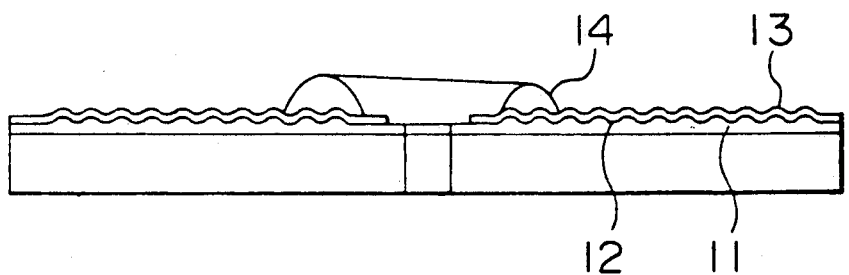

Thus, as shown in FIG. 2A, the underlayer 13 of a uniform thickness is spin coated on a signal surface 12 on the stamper 11;

(v) Next, a solution of photocuring resin 14 is placed on a portion of the upper surface of the underlayer 13 on the signal surface 12 of the stamper 11 in a doughnut shape so that the cross section thereof is formed to the shape shown in FIG. 2B.

Figure 2C:
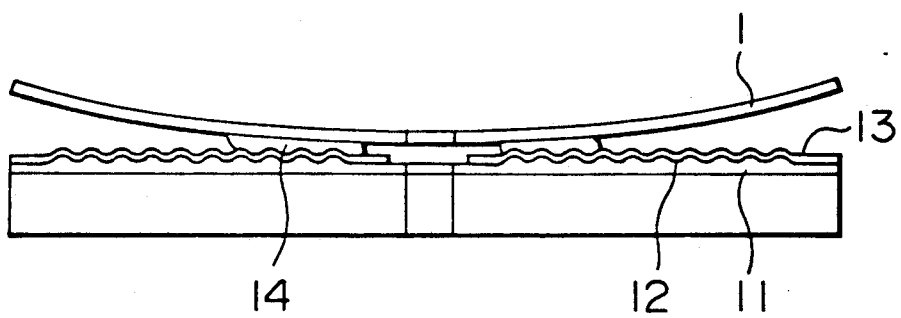
Figure 2D:
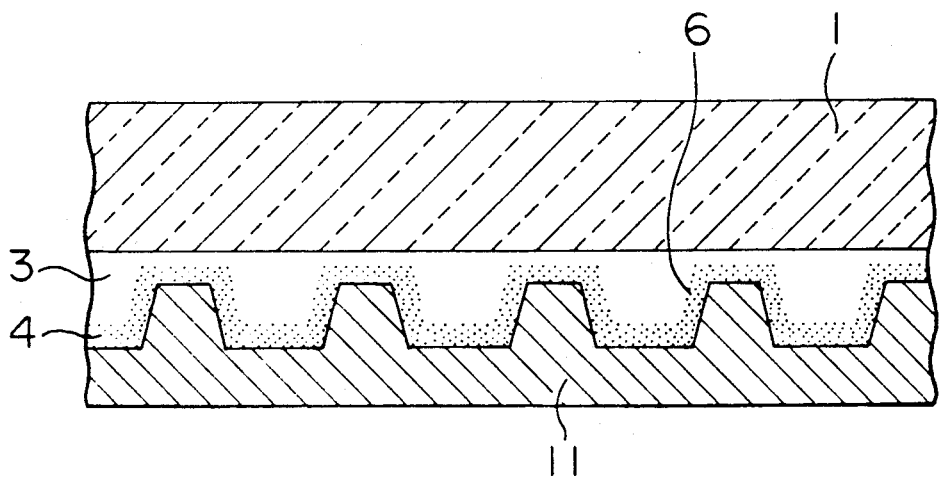

(vi) As shown in FIG. 2C, the solution of the photocuring resin 14 placed on the underlayer 13 is extended to a uniform thickness while the transparent substrate 1 is pressed against it, and left as it is for awhile to form the resin layer 3 shown in FIG. 2D.

In the instant-process, the photocuring resin 14 permeates or dissolves in the layer 13 of the underlayer compound, so that the mixed layer 4 of the resin material 14 and the above underlayer compound is formed on the surface in contact with the stamper 11 of the layer interposed between the transparent substrate 1 and the stamper 11, as shown in FIG. 2D.

Figure 2E:
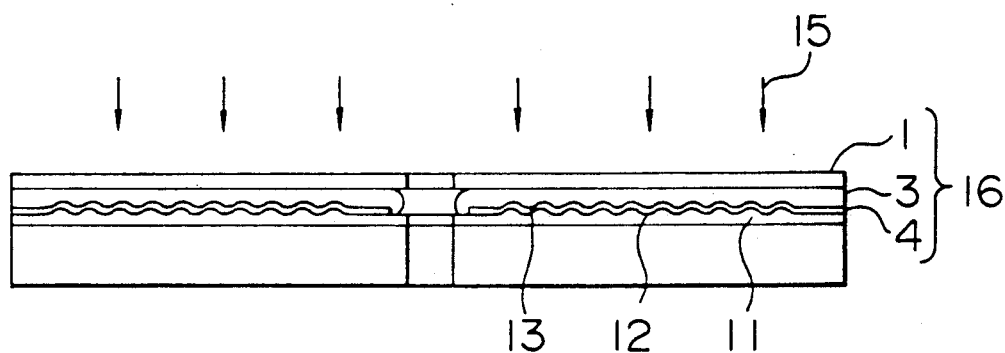
Figure 2F:
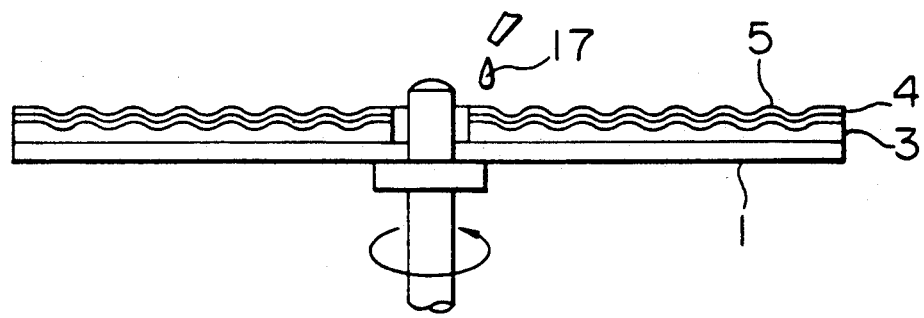

(vii) Next, as shown in FIG. 2E, resin curing light 15 is irradiated on the photocuring resin 14 to cure the same;

(viii) The whole member of the transparent substrate 1, the resin layer 3 composed of the photocuring resin 14 and the underlayer 13 (the mixed layer 4 of the photocuring resin and the compound for the underlayer material), i.e., a replica 16 is exfoliated from the stamper 11;

(ix) The obtained replica 16 is subject to a baking treatment;

(x) A solution 17 composed of the underlayer compound dissolved into a suitable solvent is dropped to the surface of the mixed layer 4 of the replica 16, while the baked replica 16 is rotated, as shown in FIG. 2F;

(xi) The rotation of the replica 16 is accelerated to extend the underlayer solution 17 to a layer shape to form the underlayer 5;

(xii) The solvent in the thus formed underlayer 5 is sufficiently dried and removed; and (xiii) The recording layer 2 is formed on the surface of the underlayer 5 of the replica 16 provided with the thus formed underlayer 5, and the replica 16 is subject to a baking treatment to provide the optical recording medium shown in FIG. 1.

Next, an optical recording medium according to the second embodiment will be described.

Figure 3:
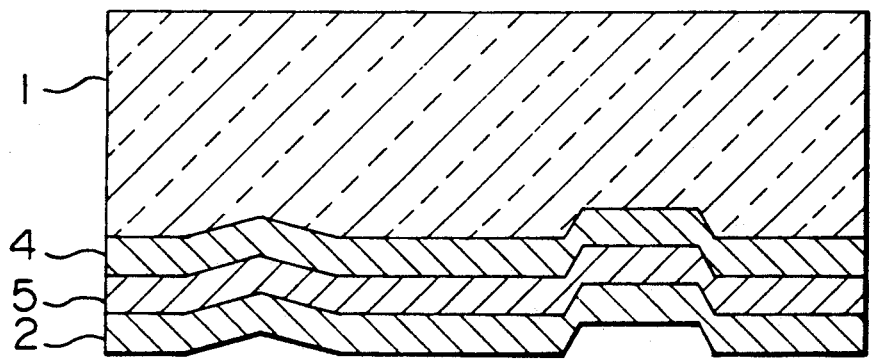
FIG. 3 is a cross sectional view schematically showing an optical recording medium according to the second embodiment.

FIG. 3 is a cross sectional view schematically showing the optical recording medium according to the second embodiment, wherein a transparent substrate 1 has one surface on which a preformat pattern 6 is integrally formed, and a mixed layer 4 of a resin material and a compound forming an underlayer, an underlayer 5 and a recording layer 2 are sequentially laminated on the preformat pattern surface.

An injection-molded thermoplastic resin substrate, glass substrate on which the preformat pattern 6 is directly cut and the like can be used as the transparent substrate 1 of the embodiment.

Since a resin material and compound forming the mixed layer 4, a material for the recording layer, and the like are the same as those used in the first embodiment, the description thereof is omitted to avoid duplication.

A method of manufacturing the optical recording medium according to the second embodiment will be described below.

Process 2

(i) The transparent substrate 1 on which the preformat pattern is formed, i.e., a replica plate is prepared;

(ii) A mixture of an underlayer compound and resin material dissolved in a suitable solvent is dropped to the replica, while it is rotated;

(iii) The rotation of the replica is accelerated to extend the mixture to a layer shape to form the mixed layer;

(iv) The formed mixed layer is dried;

(v) The mixed layer is cured by the irradiation of ultraviolet rays, heating or the like;

(vi) A solution of the underlayer compound dissolved in a suitable solvent is dropped to the mixed layer, while the replica the mixed layer of which is cured is rotated;

(vii) The rotation of the replica is accelerated to extend the underlayer to a layer shape;

(viii) The replica the underlayer of which is extended is baked and dried; and (ix) The recording layer is formed on the upper surface of the underlayer of the dried replica and baked again to form the optical recording medium.

More specific experimental examples of the optical recording medium according to the present invention will be shown below.

As described above and as apparent from Examples described below, in the optical recording medium according to the present invention, formed under the recording layer is the underlayer which is composed only of the compound which causes thermal deformation such as explosion, dissolution, evaporation, decomposition, sublimation and the like at a temperature lower than that of the recording layer, and further the above underlayer is closely adhered to the mixed layer of the underlayer compound and resin material. The optical recording medium according to the present invention is arranged as described above, and thus when a recording beam is irradiated thereto, a gas pressure sufficient to accelerate the formation of holes in the recording layer is produced. Therefore, the optical recording medium according to the present invention enables very fine pits having a diameter from 0.3 to 0.4 micron meter to be recorded, whereby the information recording density can be greatly increased and high recording sensitivity can be provided.

Further, since the underlayer composed only of the compound is formed on the mixed layer of the resin material and the compound, the underlayer can be firmly adhered to the resin material, whereby the exfoliation resistance of the underlayer of the optical recording medium can be improved under the circumstances of high temperature and high humidity.

Furthermore, since the mixed member of the resin material and the compound forming the underlayer is brought into contact with the signal surface of the stamper when the optical recording medium is manufactured, an intimate adhesion strength between the stamper and the replica can be lowered as compared with the case wherein only the single compound is brought into contact therewith, whereby the deformation of the preformat pattern and the damage of the transparent substrate can be prevented.

PREFERRED EMBODIMENTS

Example 1

It has been confirmed in Examples 1 and 2 that the optical recording medium can be manufactured by the method according to the present invention. An optical disk was selected as an example of the optical recording medium.

First, nitrocellulose dissolved into n-butyl acetate was spin coated on the signal surface of a stamper as shown in FIG. 2A so that a nitrocellulose layer as designated by 13 in FIG. 2A was formed to a thickness of about 2000 angstroms and semi-dried.

Next, an ultraviolet rays curing resin was dropped on the nitrocellulose layer and formed to a ring shape as designated by 14 in FIG. 2B. A mixed layer of the ultraviolet rays curing resin and nitrocellulose was formed on the surface where the ultraviolet rays curing resin layer was brought into contact with the stamper in the process in which a flat glass substrate, which had a uniform thickness and was subject to a silane treatment, was pressed against the ring-shaped resin to form a resin layer having a thickness of about 70 micron meters.

Resin curing light was irradiated to the resin layer so that the resin layer and the resin material in the mixed layer were cured. Next, the above mixed layer was exfoliated from the stamper at the interface thereof to take out a replica, and the replica was subject to a baking treatment in the atmosphere. The baking conditions were one hour at 140° C.

Next, the thus completed replica was rotated on a spin coating unit and nitrocellulose dissolved into n-butyl acetate was dropped to the mixed layer thereof. At the timing the nitrocellulose solution had spread over the entire mixed layer, the rotation of the replica was accelerated to dry the solution so that an underlayer composed only of the nitrocellulose was formed on the mixed layer.

Next, a tellurium-selenium-lead alloy recording layer was formed to a thickness of about 300 angstroms on the nitrocellulose underlayer by a vacuum vaporization method for simultaneously vaporizing the three materials. Thereafter, the recording layer was subject to a baking treatment for crystallization, whereby an optical disk single plate having the cross sectional structure shown in FIG. 1 was provided. The baking conditions at the time was one hour at 80° C. in the atmosphere.

Figure 4:
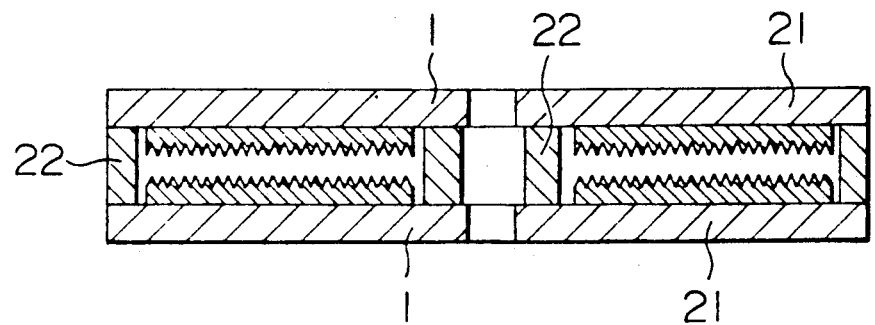
FIG. 4 is a cross sectional view showing an optical recording medium having an air sandwich structure.

Finally, the two thus made optical disk single plates 21 were bonded together through a spacer 22 to make an optical disk having the air sandwich structure shown in FIG. 4.

Example 2

In Example 2, an optical disk as an example of the optical recording medium according to the present invention was made by a method different from that used for making Example 1 according to the present invention.

First, a mixed solution of n-butyl acetate, nitrocellulose, and ultraviolet rays curing resin was spin coated on the surface of an injection molded polycarbonate substrate where a preformat pattern was formed, so that a mixed layer having a thickness of about 2000 angstroms was formed on the signal surface of the polycarbonate substrate.

Thereafter, similarly to Example 1, the ultraviolet rays curing resin in the mixed layer was cured and dried, further a nitrocellulose underlayer and a recording layer were sequentially formed on the mixed layer, whereby an optical disk single plate having the cross section shown in FIG. 2 was provided. Next, the thus made two optical disk single plates were bonded together to make an optical disk having an air sandwich structure.

Example 3

In Example 3, various tests and comparative tests were carried out with respect to the optical recording mediums according to the present invention made in Examples 1 and 2.

Figure 5:
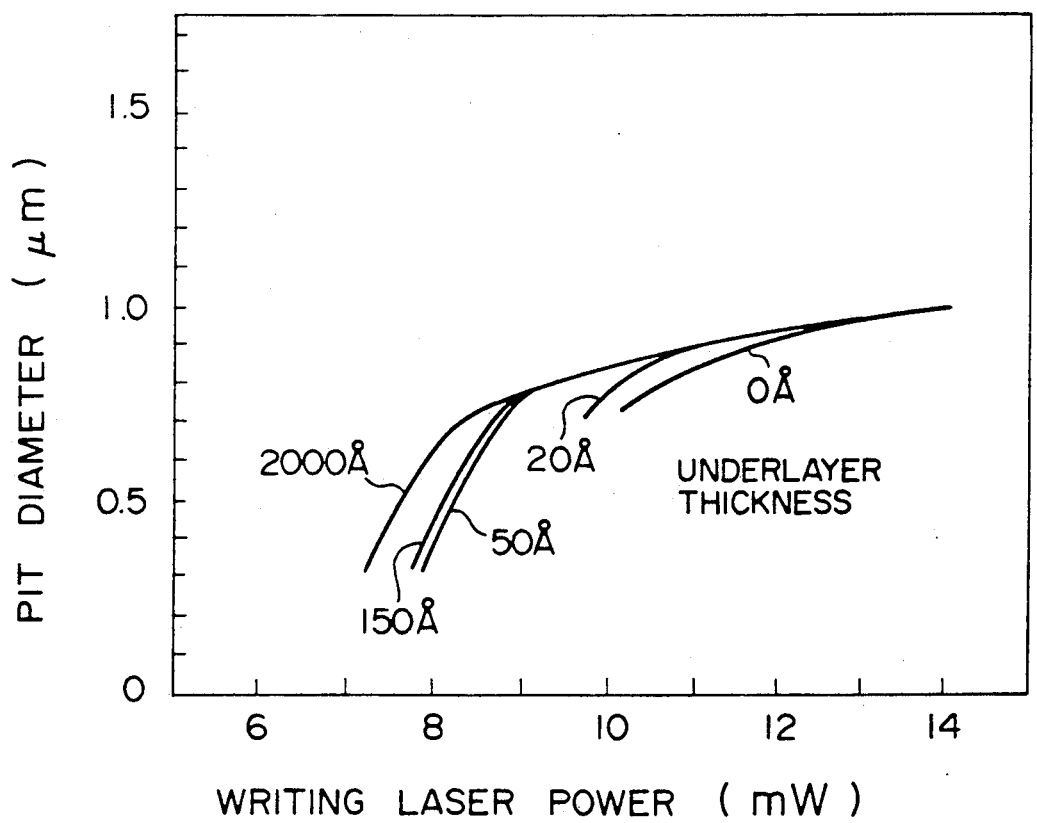
FIG. 5 is a graph showing the relationship between a writing laser power and a diameter of a pit defined to a recording layer.

First, with respect to the optical recording mediums made in the above Examples, the relationship between a writing laser power and a diameter of a pit defined to the recording layer was examined, when a film thickness of the nitrocellulose underlayer was changed. FIG. 5 shows the result the examination.

First of all, it is found from the graph that the optical disk provided with the underlayer composed only of nitrocellulose requires a lowered writing laser power to define a pit having a diameter (about 0.7 to 0.8 micron meter) as compared with the optical disks having the same diameter as the above which are not provided with the underlayer composed only of nitrocellulose, which shows that the underlayer composed only of nitrocellulose is effective to improve recording sensitivity.

In particular, when a thickness of the nitrocellulose underlayer was formed to a thickness of 50 angstroms or more in the former optical disk, a pit having the smallest diameter, which is one half of the smallest diameter of a pit defined to the latter optical disks (the pit defined to the latter optical disks had a diameter of 0.72 micron meter, whereas the pit defined to the former optical disk had a diameter of 0.3 micron meter), could be defined with a writing laser power which was 2 mW or more smaller than that required by the latter optical disks.

Figure 6:
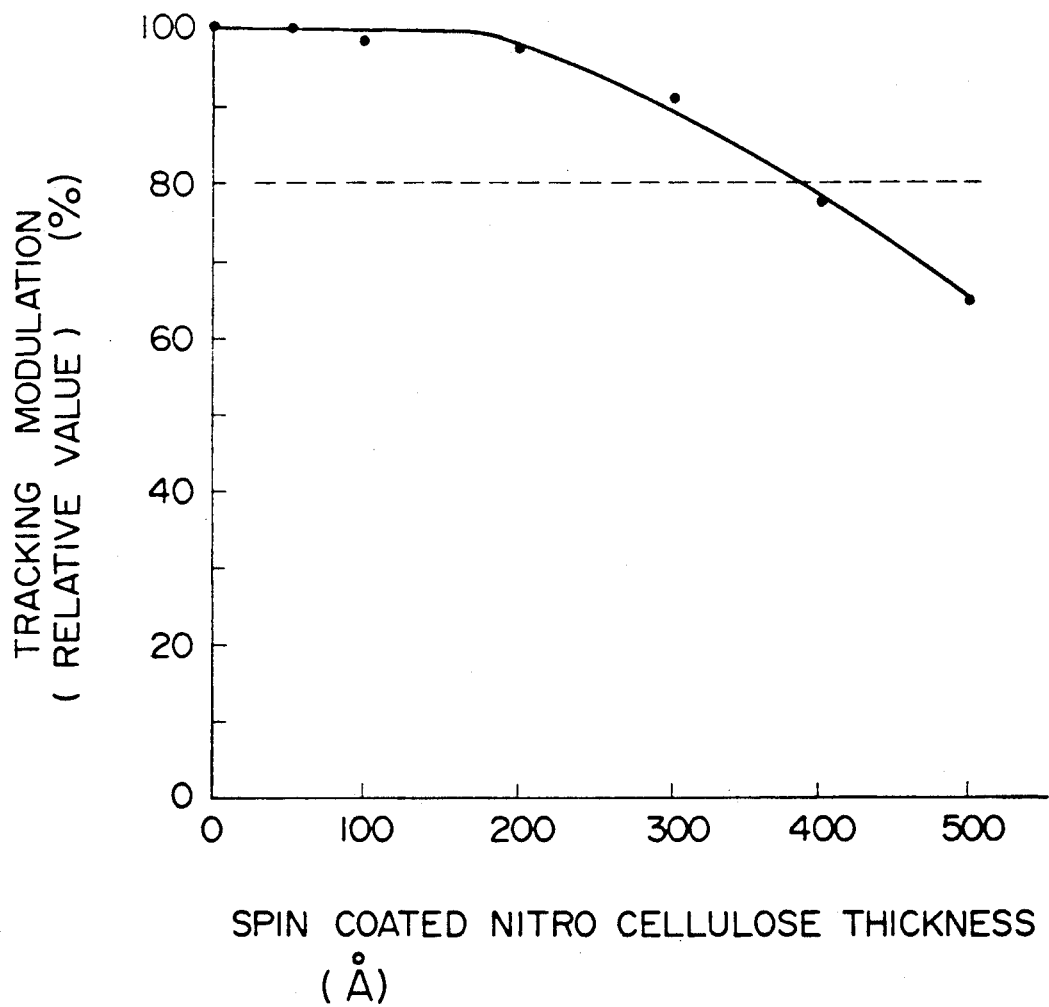
FIG. 6 is a graph showing the relationship between a thickness of a nitrocellulose underlayer and a track modulation.

Next, a change in a track modulation was examined, when a film thickness of the underlayer composed only of nitrocellulose was changed, and the result of the examination is shown in FIG. 6.

Figure 7:
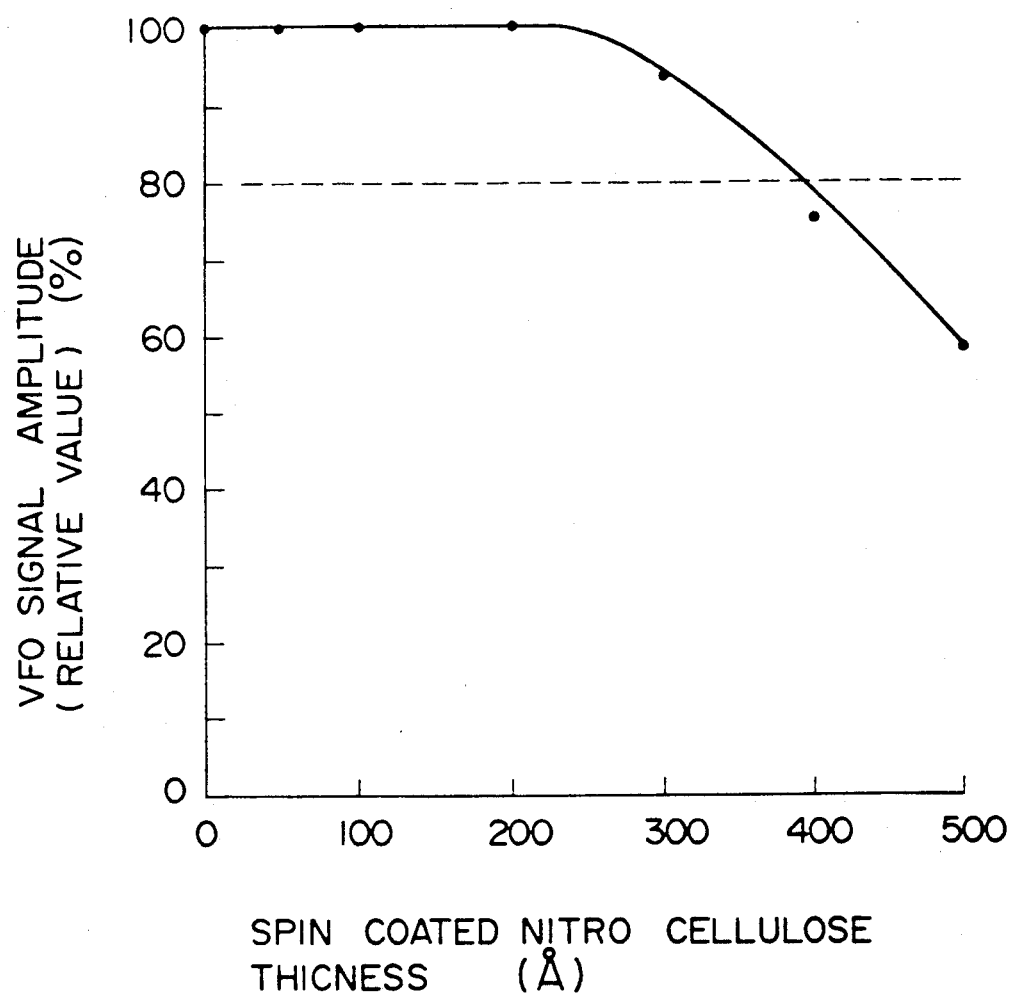
FIG. 7 is a graph showing the relationship between a thickness of the nitrocellulose underlayer and an amplitude of a VFO signal read out from a medium.

Further, FIG. 7 shows a change in amplitude of a VFO signal read out from a clock pit, when a film thickness of the nitrocellulose underlayer was changed.

FIGS. 6 and 7 will be described below.

When the underlayer composed only of nitrocellulose is formed on the signal surface in the recording medium according to the present invention, the concave preformat pattern is filled with it and the shape and size thereof are changed, which affects the presence of the preformat pattern to the recording film. As a film thickness of the underlayer is made thicker, a track modulation and an amplitude of the VFO signal are reduced. Although an allowable level of the reduction in the track modulation and the amplitude of the VFO signal depends on a drive, it is considered that when the reduction in them is 80% of the optical disk not provided with the underlayer composed only of nitrocellulose, a normal recording and reproduction vibration can be achieved. It is found from FIGS. 6 and 7 that a film thickness of the underlayer composed only of nitrocellulose is preferably restricted to about 400 angstroms or less to obtain such a modulation and amplitude of the VFO vibration.

Further, FIG. 5 shows that when the underlayer composed of nitrocellulose has a thickness of 50 angstroms, a pit having a diameter of about 0.3 micron meters can be sufficiently formed. As a result, it is necessary that the lower limit of a thickness of the underlayer composed only of nitrocellulose is about 50 angstroms for the function of the single component of nitrocellulose to be sufficiently achieved.

Furthermore, an acceleration circumference test was carried out with respect to the optical disks of Examples and the optical disks of prior art. As the test conditions, the optical disks were left in the circumference of a high temperature of 60° C. and a high humidity of 90% RH. In the test, the underlayer of the optical disks according to Examples of the present invention exhibited no abnormal states after 5000 hours had passed. In addition, in the test of the optical disk not provided with the mixed layer, the underlayer thereof was exfoliated from the transparent substrate or from the portion where the resin layer was closely adhered to the underlayer, after about 1000 hours had passed.

Further, a life test of the stampers used to produce the optical disks was carried out. The stamper used to produce the optical disks according to the present invention could made more than 5000 pieces of replicas, whereas with respect to the stamper used to produce optical disks which did not include the mixed layer and employed a photocuring type replica method (2P replica method), i.e., one of prior arts, a glass substrate was broken when the stamper made several pieces of replicas.

Next, the following tests were carried out with respect to a thickness of the recording film of the recording mediums according to the present invention.

Figure 10:
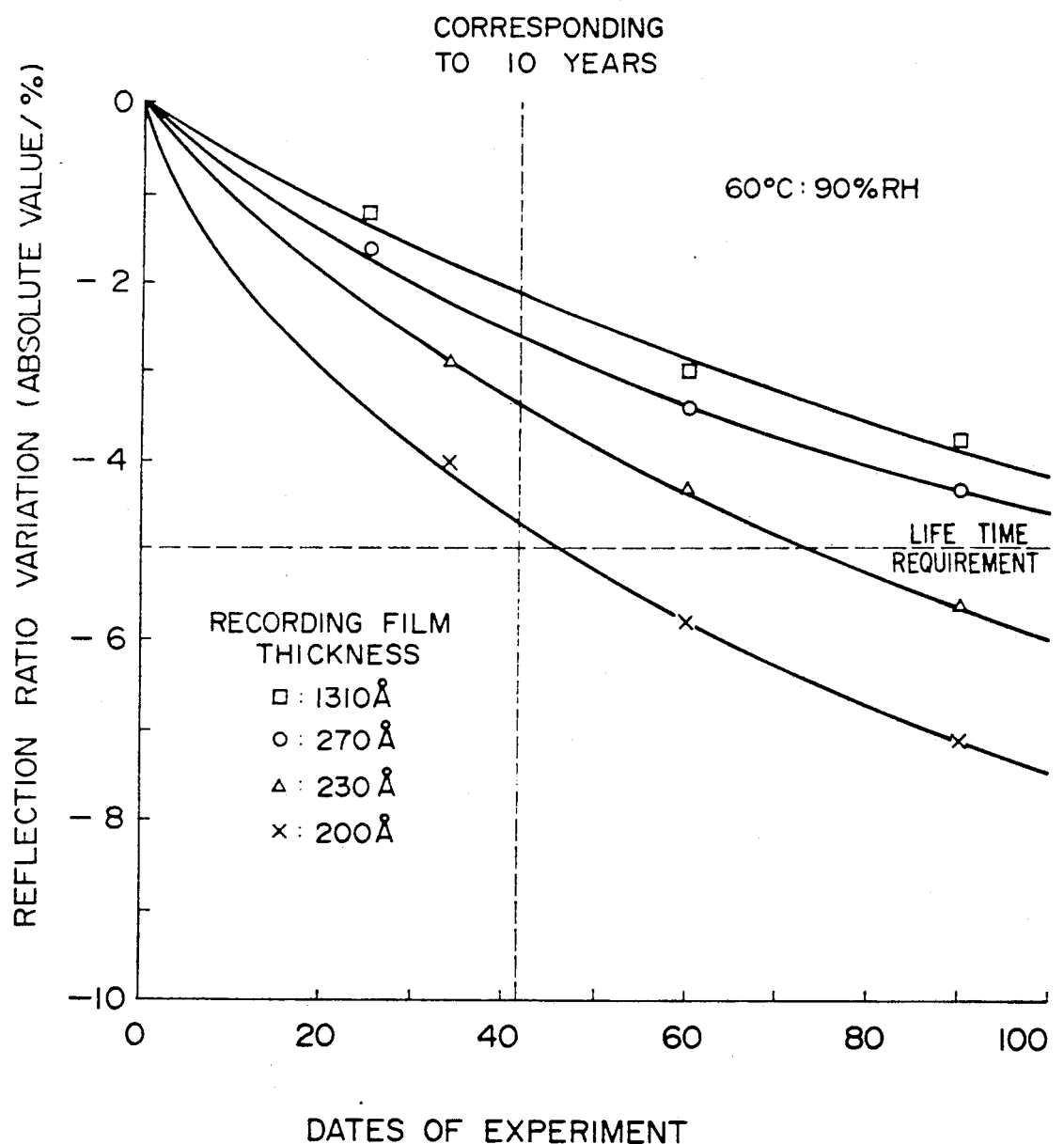
FIG. 10 is a graph showing the relationship between a thickness of a recording film and a change with age of a reflectance.

A change with age in a reflectance obtained when a thickness of the recording film was changed was examined by an acceleration test, and the result of the examination is shown in FIG. 10. It is found from the graph that a standard life, i.e., a thickness of the recording film which can achieve a practical life is at least 200 angstroms.

In addition, the relationship between a film thickness of the recording film and the occurrence of cracks was examined, and the result of the examination is shown in FIG. 11. It is found from FIG. 11 that the cracks were produced when a thickness of the recording film exceeded 310 angstroms, and the thicker the film thickness, the more cracks were produced. As a result, it is found that the practical upper limit of a film thickness of the recording film is 310 angstroms.

The above various tests were carried out to all the optical recording medium of the above embodiments and the similar results as those of Examples 1 and 2 were obtained.

The gist of the present invention rests in providing the mixed layer composed of the resin material and the compound forming the underlayer and the underlayer composed only of the compound which are formed under the recording layer, and thus the kind of compound, content thereof, film thickness, and the like are not limited to those described with reference to the above embodiments, but can be arbitrarily designed, as necessary.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical recording medium, comprising a transparent substrate, a replica layer formed on one surface of said transparent substrate, and a layer consisting of a first organic compound and a recording film layer laminated in this order on the surface of said replica layer onto which a preformat pattern is transferred, said replica layer being composed of a second organic compound layer and a mixed layer including said second organic compound and a first organic compound in this order from the transparent substrate, said mixed layer being composed of said first organic compound and said second organic compound wherein said second organic compound is selected from at least one member of the group consisting of photocuring resin materials and said first organic compound is selected from at least one member of the group consisting of nitrocellulose, polyvinyl alcohol, polyvinyl alcohol nitrate, a mixture of polyvinyl alcohol and barium azide, polymethyl penten sulfone, polytetrafluoroethylene, quanine, and a plasma copolymer of said hydrocarbon compounds.

2. An optical recording medium according to claim 1, wherein said layer consisting of said first organic compound ranges in thickness of from 50 to 400 angstroms and said recording layer ranges in thickness of from 200 to 310 angstroms.

3. An optical recording medium according to claim 1, wherein said first organic compound is capable of being thermally decomposed at a temperature within a range of from 150° C. to 450° C.

4. An optical recording medium, comprising a transparent substrate onto one surface of which a preformat pattern is transferred, a mixed layer composed of a material of said transparent substrate and a first organic compound, a layer composed only of a first organic compound and a recording film layer being laminated in this order onto said surface of said transparent substrate on which said preformat pattern is transferred, wherein said first organic compound is selected from at least one member of the group consisting of nitrocellulose, polyvinyl alcohol, polyvinyl alcohol nitrate, a mixture of polyvinyl alcohol and barium azide, polymethyl penten sulfone, polytetrafluoroethylene, quanine, and a plasma copolymer of said hydrocarbon compounds, wherein said layer consisting of said first organic compound ranges in thickness of from 50 to 400 angstroms and said recording film layer ranges in thickness of from 200 to 310 angstroms.

* * * * *